March 7, 1939.　　　M. C. ZILBERMAN ET AL　　　2,149,487

HALF-TONE ENGRAVING AND APPARATUS FOR AND METHOD OF MAKING THE SAME

Original Filed May 15, 1934　　　7 Sheets-Sheet 1

INVENTORS
*Myron C. Zilberman*
*Leander O. Thunberg*
*Leo V. Skinner*
BY
*Blair, Curtis & Dunne*
ATTORNEYS

March 7, 1939.  M. C. ZILBERMAN ET AL  2,149,487

HALF-TONE ENGRAVING AND APPARATUS FOR AND METHOD OF MAKING THE SAME

Original Filed May 15, 1934   7 Sheets-Sheet 5

INVENTORS
Myron C. Zilberman
Leander O. Thunberg
Leo V. Skinner
BY
Blair, Curtis & Dunne
ATTORNEYS

March 7, 1939.   M. C. ZILBERMAN ET AL   2,149,487
HALF-TONE ENGRAVING AND APPARATUS FOR AND METHOD OF MAKING THE SAME
Original Filed May 15, 1934   7 Sheets-Sheet 6

INVENTORS
Myron C. Zilberman
Leander O. Thunberg
Leo V. Skinner
BY
Blair, Curtis & Dunne
ATTORNEYS Patented Mar. 7, 1939

2,149,487

UNITED STATES PATENT OFFICE 2,149,487

HALF-TONE ENGRAVING AND APPARATUS FOR AND METHOD OF MAKING THE SAME

Myron C. Zilberman, Brooklyn, Leander O. Thunberg, Bronx, and Leo V. Skinner, New York, N. Y.

Application May 15, 1934, Serial No. 725,716
Renewed July 28, 1938

6 Claims. (Cl. 178—6.6)

The present invention relates to an improvement in half-tone engravings and apparatus for and method of making the same. An object of our invention has been to provide a photoengraving or half-tone plate more particularly of the type in which the nonprinting or recessed portions are produced by cutting away the material of the plate with a tool rather than by the usual etching processes and which, although produced at a lower cost and in a shorter time, has the desirable qualities of the usual half-tone plate with the additional advantage that the edges of the recesses are even and continuous as contrasted with those in an etched plate which are undereaten by the acid and irregular. A further object has been to provide a method and apparatus whereby we may rapidly and economically produce plates of the type above mentioned.

Previously proposed methods of half-tone engraving without etching and without the use of the usual screen, have produced plates lacking particularly the regularly spaced and aligned dots or screen affect which characterizes the accurate reproduction of half-tone values in well known photoengraving methods. Our improved plate provides an accurate reproduction and a visual effect similar to that of the usual half-tone plate and lends itself to rapid and effective manufacture by means of our improved apparatus and method.

An embodiment of our improved plate and of apparatus capable of being successfully employed in practicing our improved method of photoengraving are described in the following specification and illustrated in the drawings appended thereto and in which—

Figure 1:
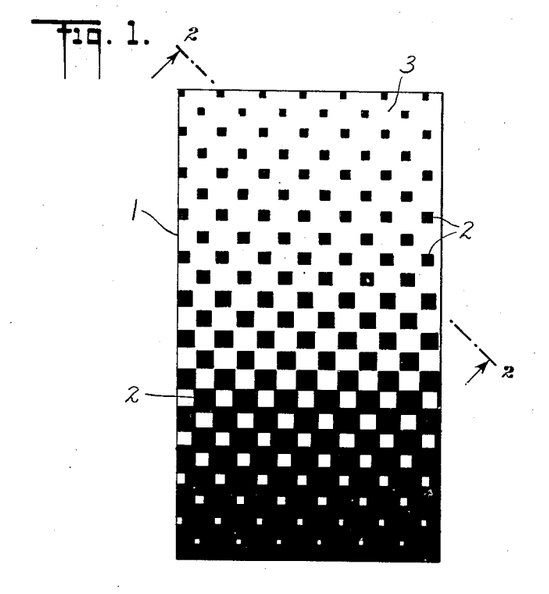
Figure 1 is a plan view of a portion of a photoengraving or half-tone plate on enlarged scale with the printing or relief surfaces represented in black and nonprinting surfaces or recess portions represented in white.
Figure 2:
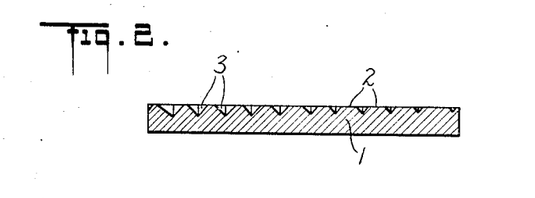
Figure 2, a section on the line 2—2 of Figure 1.

Referring to the drawings, the half-tone engraving illustrated in Figure 1 comprises a metal plate 1 of copper, zinc or the like of which one face is provided with a plurality of regularly arranged relief or printing surfaces 2. The spaces 3 shown in Figures 1 and 2 represent nonprinting surfaces or recess portions exposed below the level of the printing surfaces 2 after the metal adjacent thereto has been cut away. With the arrangement of printing and nonprinting surfaces shown in Figure 1, the upper end portions of plate 1 will print white or a light tone and lower end portions will print black or a dark tone. A graduated half-tone is produced by the intermediate portions. The printing or relief surfaces 2 diminish in area from dark printing portions to light printing portions of the plate while the recesses 3 increase in depth and area from the dark printing portions to the light printing portions of the plate. In a preferred arrangement, the separated printing surfaces and the separated recesses are square in shape.

Figure 3:
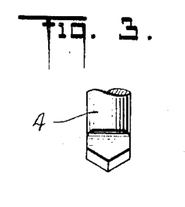
Figure 3, a rear elevation of a form of cutting tool employed in producing the nonprinting portions shown in Figure 1.
Figure 4:
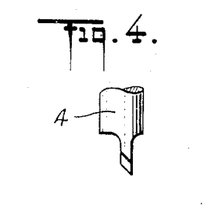
Figure 4, a side elevation of said tool shown in Figure 3.

It will be understood that the contours of the recesses or nonprinting surfaces or spaces 3 may differ in shape from those shown in Figure 2 which merely illustrate a contour produced when the recesses are cut by means of a tool or stylus 4 having cutting edges formed or disposed substantially like those shown in Figures 3 and 4.

From the foregoing description of our improved half-tone plate, taken in connection with the drawings thereof, it will be apparent that the printing or relief surfaces and the nonprinting surfaces of recesses are so disposed that the centers of the printing surfaces are aligned in parallel equally spaced rows and the centers of the recesses are in staggered relation to said centers of the printing surfaces and are aligned in parallel equally spaced rows alternating with the rows of printing surfaces. Accordingly, all portions of the plate which print substantially the same tonal value present an effect of regularity and uniformity in the spacing and alignment of the printing surfaces and in their relation to the nonprinting surfaces thereof.

Figure 5:
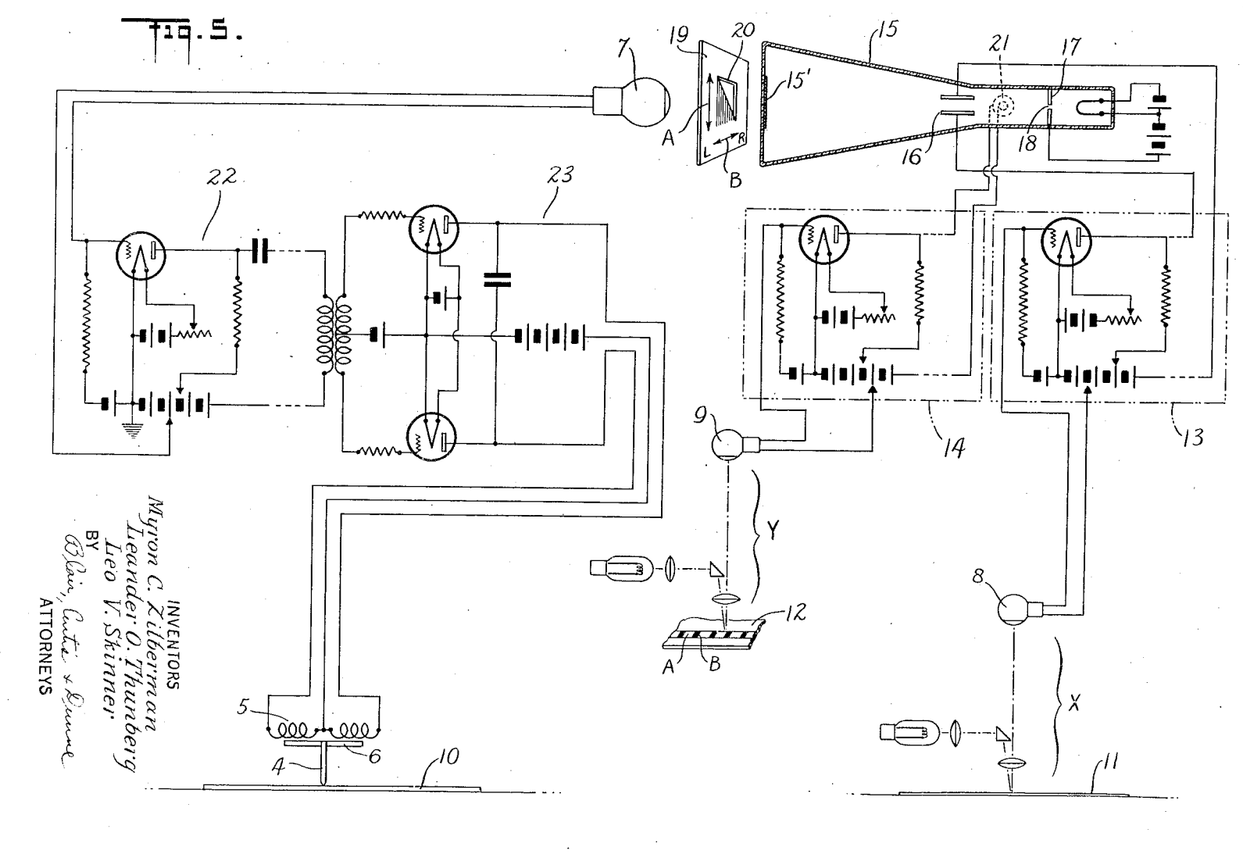
Figure 5, a diagrammatic representation of scanning and tool controlling devices for producing the plate illustrated in Figure 1.

According to one method of making a half-tone having the above described characteristics, a suitable metal plate or blank is arranged in a predetermined relation to a photograph, drawing or other representation of which the dark and light portions are to be reproduced in like values on said metal blank in terms of printing and nonprinting surfaces. Portions of the face or exposed surface of the blank are then successively cut away in varying areas and to varying depths in response to variations occurring in controlling devices and produced in regular sequence by suitable scanning devices operating in effective relation to successively presented portions of the picture to be reproduced. More specifically, in accordance with our improved method, an inertialess element, as a cathode ray or like beam or ray is employed to transmit photoelectric effects or impulses representing tone or color value variations from successively presented portions of the picture to the stylus or cutting tool which operates upon successively presented portions of the plate to be engraved. For example, as indicated in Figure 5, the cutting tool 4 is shown in operative relation to a blank or plate 10 and as connected to or forming part of a push-pull electromagnet having a coil 5 and an armature 6, and energized selectively in a manner hereinafter to be explained through suitable instrumentalities interposed in the output circuit of and including a photoelectric cell 7.

The impulses which by their combined effect control current values in the circuit of said push-pull magnet through the photoelectric cell 7 are preferably derived from separate but synchronized sources. One source includes the scanning device X having the photoelectric cell 8 arranged to translate varying degrees of light reflected from light and dark portions of the picture 11, or other representation, into terms of electrical impulses of varying values. The other source which includes another scanning system Y having the photoelectric cell 9 constitutes appropriate means for interposing periodic interruptions in the effects of the varying currents provided by the first source. To produce this result, scanning system Y cooperates with successively presented light areas A and dark areas B, Figure 5, of suitable relative extent appearing as markings on a sheet or strip 12, the light areas being longer than the dark areas. In some cases a piece of standard 65 mesh screen wherein the areas are of equal length may be employed. The separately derived current value changes resulting from simultaneous and synchronized operation of the photoelectric cells 8 and 9 are combined to control the energizing effect of a light spot, resulting from cathode ray impact, on the photoelectric cell 7 to produce a succession of properly timed recess cutting movements of the tool 4 and to control the depth and/or area of each cut or recess in accordance with the lightness or darkness of different portions of the picture 11 as they are successively presented in scanning.

Our improved method further involves effecting differential movement between the picture 11 and the scanning system X and between the strip 12 of screen or the like and the scanning system Y. Where the movement involving picture 11 is reciprocating or oscillating, a similar movement synchronized therewith is effected in relation to strip 12. Thus, the printing and nonprinting surfaces produced on the plate 10 in each scanning cycle are always aligned with those of each other scanning cycle.

In addition to the relative oscillating movement hereinabove referred to between picture 11 and the scanning system X, we provide a further relative movement which constitutes in effect a step by step spacing or feeding movement of one of said elements in relation to the other during or at any suitable phase of each scanning cycle. It will be understood that the extent of the spacing movement for each scanning cycle is normally equivalent to the width of the cutting portion of tool 4, or to the distance between the usual screen elements, or to the size of the screen mesh. In a typical case, this dimension is such as to scan approximately 65 rows or lines to the inch. Obviously, this spacing of the scanning lines may be made to vary depending upon whether the reproduction is intended to present a coarse mesh screen appearance or a fine mesh screen appearance.

It will be apparent that corresponding relative movements will be required between the tool or stylus 4 and plate 10, namely an oscillatory cutting movement and a spacing movement in a direction transversely thereto, these movements being the same as or in proportion to the movements provided between picture 11 and the scanning device X.

Whatever the apparatus used for obtaining the necessary synchronized relative movements, successful operation of an engraving machine utilizing our improved method also requires sensitive and powerful instrumentalities for usefully employing the current value changes occurring in photoelectric cells 8 and 9 to control operation of the stylus 4. For this purpose, an amplifier 13 is arranged in the circuit of cell 8 and an amplifier 14 in the circuit of cell 9. A cathode ray is developed in a cathode ray tube 15 provided with an anode 17 having an opening 18 through which the ray is projected on a suitably sensitized screen 15' to form a light spot opposite the light stop 19 having an opening 20, said stop and said opening being interposed between the opening 18 in anode 17 and the photoelectric cell 7.

A condenser 16, in circuit with the output of amplifier 13 is so arranged in relation to the path of the cathode ray that variations in the charge impressed upon the condenser cause proportionate deflection of the ray, and therefore of the portion of the light spot in the direction, indicated by the arrows A, Figure 5. The cathode ray is also periodically deflected in the direction of arrows B by suitable means, as an induction coil 21 operatively positioned in relation to the cathode ray tube and in circuit with the output of the amplifier 14 preferably through any suitable or well known time lag producing device, as a sweep circuit indicated at S. Thus, current value variations occurring in the photoelectric cell 8 effect proportionate bending or deflection of the cathode ray in one direction while the impulses or current variations occurring in photoelectric cell 9 cause periodic deflections of the cathode ray in a direction at right angles thereto, or from left to right in the arrangement illustrated in Figure 5.

Where the strip 12 carries a succession of white areas alternating with black areas, the instrumentalities may be calibrated so that the cathode ray tends to be deflected to the extreme left of its path in response to the occurrence of a black spot and to the right in response to the occurrence of a white spot on said strip and that the resulting movements will be timed in proportion to the relative sizes of said white and black areas. The instrumentalities for bending the cathode ray in a vertical direction are so calibrated that the ray bends downwardly in response to the occurrence of relatively darker portions on the picture being reproduced and upwardly in response to the occurrence of relatively lighter portions, the range of movement of the ray corresponding to the extreme range of tone value between the darkest and the lightest portions of the picture to be reproduced. Accordingly, with the light stop 19 and its aperture 20 positioned in substantially the relation shown in Figure 5, the period of activity of the photoelectric cell 7 during each complete impulse cycle depends directly on the position of the cathode ray and therefore of the light spot on screen 15' as determined by the combined effect of the output from photoelectric cells 8 and 9 respectively.

The output of photoelectric cell 7 in the form of impulses of varying duration is in turn amplified by a suitable instrument, as 22, coupled to a further amplifying and inverting instrument 23 which combines amplifying and inverting or reversing characteristics without the interposition of mechanical or physical instrumentalities. Amplifiers and inverters of this type employ the so-called Thyratron tubes and appropriate circuits, such as designed by the General Electric Company and possibly others. The magnetizing coil 5 of the tool actuating magnet is energized alternately in opposite sense by the output from amplifier-inverter 23, the impulses in one direction producing cutting movements of tool 4 each corresponding in extent to the time during which photoelectric cell 7 is energized by the cathode ray during each complete transverse oscillation thereof. For example, when this ray is bent to the up position, Figure 5, cell 7 is energized over a period corresponding to the greater part of the whole cutting cycle, whereas, when the ray is bent down, cell 7 is energized for a shorter period.

The instrumentalities diagrammatically shown in Figure 5 may obviously be incorporated in widely different types of photoengraving machines, one embodiment of practical commercial apparatus being illustrated in Figures 6 to 14 inclusive. Referring thereto, our improved engraving machine comprises a frame 24 upon which a cutting table 25 and a picture scanning table 26 are mounted to slide to and fro in longitudinally extending grooves 27 and 28, Figure 8, said cutting table 25, being adapted to receive and hold a plate 10 to be engraved, and said scanning table 26 being adapted to receive and hold a picture 11 or other representation to be reproduced. The strip 12 bearing the screen markings or dot and dash pattern previously described may be carried on either table. It will be understood that, so far as our improved method is concerned, a single slidable table may be used where the engraving is to be the same size as the picture and that the scanning and/or cutting devices may be made to reciprocate in relation to the table or tables.

Figure 9:
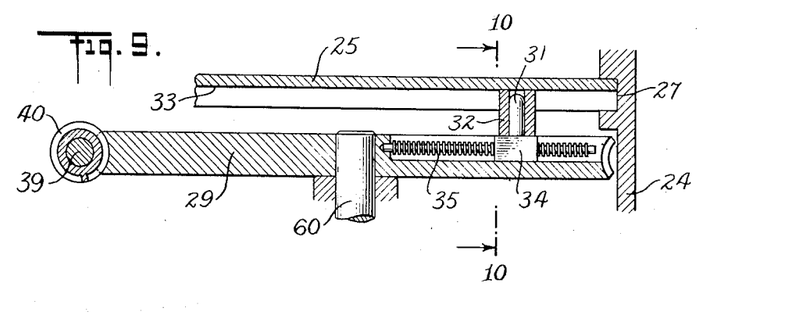
Figure 9, an enlarged detail in vertical section illustrating a portion of the mechanism provided for effecting oscillatory motion of the plate and picture carrying tables of the machine illustrated in Figure 6.
Figure 10:
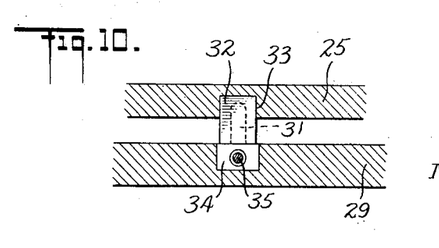
Figure 10, a vertical section on the line 10—10 of Figure 9.

Synchronized to and fro movement of said tables 25 and 26 may be effected by any suitable means comprising, in the illustrated embodiment, relatively large gears 29 and 30 respectively, each of which carries a radially adjustable pin 31, Figure 9, projecting into a roller bearing 32. A groove 33 extends transversely across the under side of table 25 and receives the upper end of roller bearing 32. The pin 31 is carried by a nut 34 mounted on a screw threaded spindle 35 radially mounted in relation to the gear 29. The position of nut 34 and consequently of pin 31 in relation to the center of gear 29 is adjusted by turning spindle 35. The effect of this adjustment is to control the length of the sliding stroke of the table 25 during the scanning cycle. The picture scanning table 26 is also provided with an adjustable driving mechanism, similar to that shown in Figure 9. Under some conditions of operation, the radial position of pin 31 in respect to one of said tables may be different from that of the corresponding pin in respect to the other table. This arrangement permits a given picture or other representation to be reproduced on a plate in enlarged or reduced size. The gears 29 and 30 are driven by a motor 36 through a gear train including bevel gears 37 and 38 and a shaft 39 having a worm-gear, as 40, at each end engaging the periphery of the gears 29 and 30 respectively.

The scanning devices previously referred to include preferably two separate systems X and Y, one of which, X, is arranged to scan the picture 11 and the other of which, Y, is arranged to scan the strip 12, Figure 5. Although it is relatively immaterial whether the strip 12 be carried on table 25 or table 26, in commercial practice, the need for making the engraved plate smaller than the picture probably occurs more frequently than the need for making the engraved plate larger than the picture. Accordingly, the apparatus illustrated in Figure 6, for example, is so arranged that the screen 12 is carried on table 25 which also carries the plate 10. This leaves the whole surface of table 26 available for accommodating a picture of large size as compared to the plate to be engraved therefrom and permits wider control of the number of dots per inch on the printing plate where the latter differs in size from the original or pattern.

Figure 11:
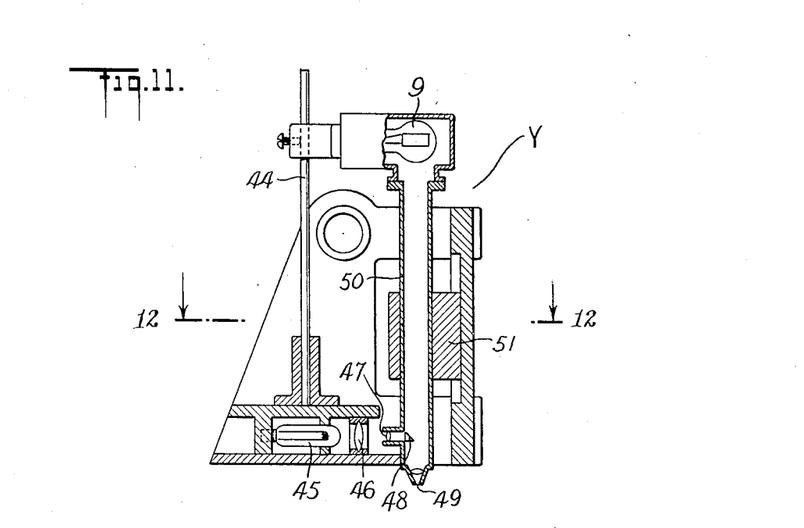
Figure 11, a view in vertical section illustrating details of construction of a scanning unit.
Figure 12:
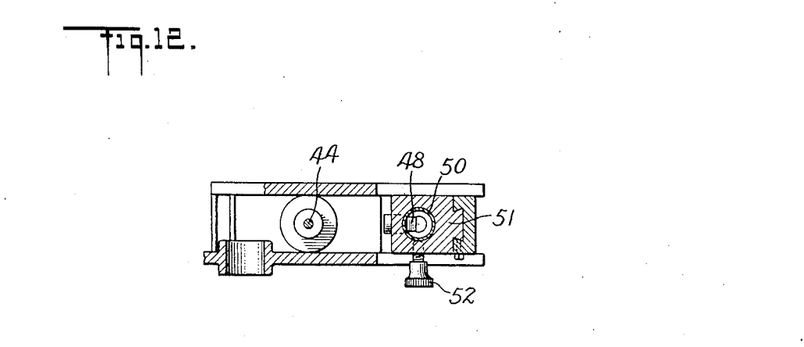
Figure 12, a transverse horizontal section on the line 12—12 of Figure 11.
Figure 13:
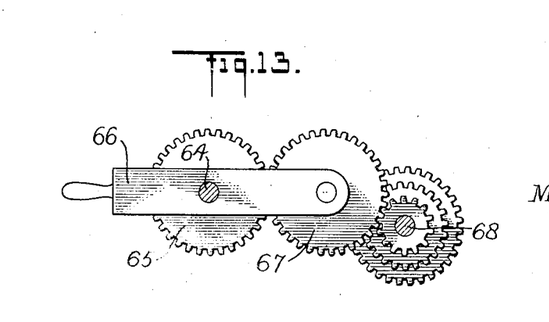
Figure 13, a fragmentary detail illustrating portions of the chain drive speed control mechanism.

The scanning device Y, as illustrated in Figures 11 and 12, is mounted on rods 41 and 42 supported at their ends by brackets 43 in suitable position above the reciprocating table 25, and includes the photoelectric cell 9 conveniently enclosed in a housing adjustably mounted on an upright rod 44. A lamp 45 or other suitable light source supplies light rays which are concentrated by lenses 46 and 47 on the reflecting surface of a prism 48 from which the concentrated rays are directed downwardly onto the strip through an opening 49 in the end of a tube 50 adjustably mounted in respect to a slidable block 51 and retained in engagement therewith by means of a thumbscrew 52, Figure 12. These rays are then reflected upwardly from the strip with varying intensity from the white and black areas thereof to the cell 9. In operation, the scanning device Y remains stationary while the strip 12 is reciprocated in relation to the opening 49 thereof with the to and fro movement of table 25.

Figure 6:
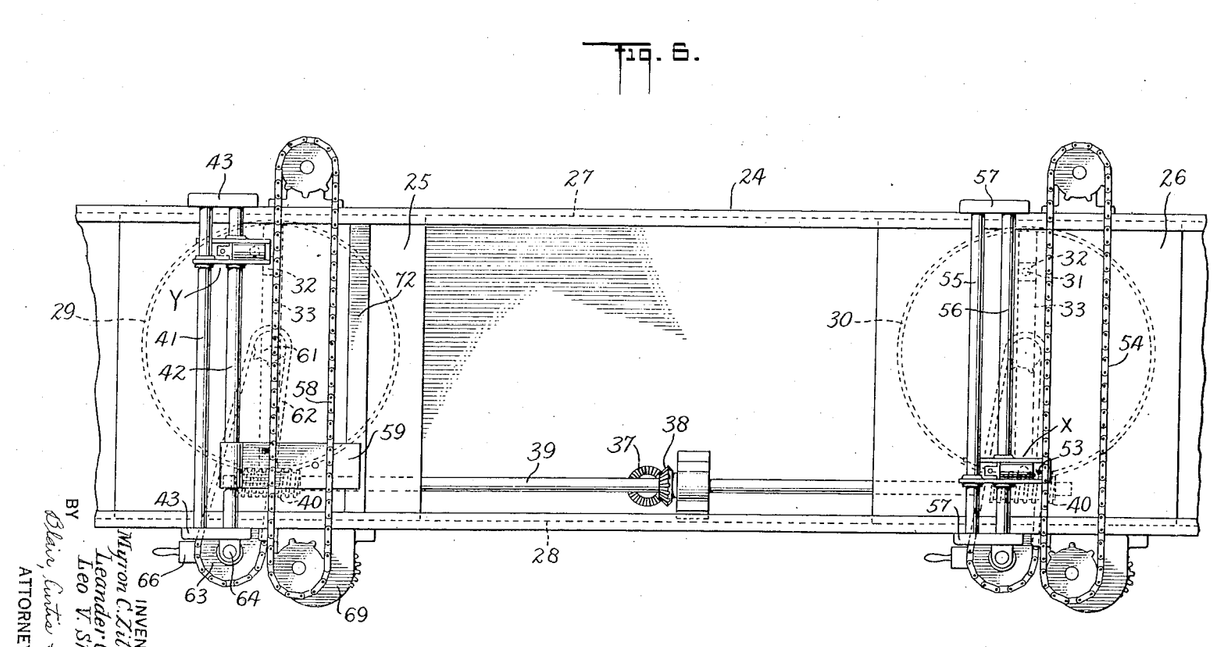
Figure 6, a top plan view of an engraving machine incorporating the instrumentalities shown diagrammatically in Figure 5.

The other scanning device, X, for scanning the picture to be reproduced, may be similar in all respects to the scanning device, Y, above described, except that, as indicated in Figure 6, it is provided with a bracket 53 adapted to be releasably connected to an endless chain 54 or the like. Scanning device X is supported in sliding engagement with rods 55 and 56 mounted between brackets 57 above the picture scanning table 26, and is moved slowly, as compared to the reciprocating movement of said table, along said rods by chain 54 to effect spacing between the lines of areas successively scanned by the scanning unit X. This spacing corresponds to a similar or proportionate spacing between the lines of cuts made by the tool 4 during successive advancing movements of table 25 in relation to the plate cutting devices.

As indicated in Figure 6, a driven chain 58, similar to the chain 54, is releasably connected to a cutting head which includes a bracket 59; and said chains 54 and 58 are synchronized in their movement and driven by similar means. The arrangements for actuating chain 58 are illustrated more particularly in Figures 6, 7 and 8. Referring to Figure 8, the gear 29 is mounted on a shaft 60 which carries a sprocket 61 arranged to drive a chain 62. A sprocket 63 is mounted on a shaft 64 which also carries a pinion 65 slidably mounted on said shaft and secured thereto by a suitable spline or other device for a similar purpose. As shown in greater detail in Figure 13, sliding movement of the pinion 65 along shaft 64 is effected by means of a yoke 66 pivotally mounted on said shaft and provided with bearings at its outer ends which support an idler gear 67. In the embodiment illustrated in Figure 7, the idler 67 is mounted to selectively engage one of any suitable number of gears, as three for example, mounted on a shaft 68, the turning motion of said shaft being transmitted to a gear train contained in housing 69 and adapted to reduce the speed of turning and thereby to actuate the drive chain 58 at a very slow speed which may be varied in corresponding degrees by the above described chain speed control device including said yoke 66, idler 67 and the selective gears mounted on shaft 68. The motion thus transmitted to drive chain 58 causes transverse spacing movement of the cutting head across the path of movement of the table 25 and hence of the metal plate 10 to be engraved. The rate of movement of the cutting head will preferably be equal or proportionate to that of scanning device X and such as to effect a spacing between rows of cuts equal or approximate to that provided in the opposite direction by the screen 12 and scanning mechanism Y.

In the embodiment of our invention illustrated in the drawings, it is contemplated that chain 54, for operating the picture scanning head X, will be driven and controlled by devices similar to those for actuating chain 58 and varying the rate of transverse or spacing movement of the cutter across the plate. It is noted that independent speed or spacing control means for chains 54 and 58 are desirable particularly where the engraved plate is to be of a larger or smaller size than the picture to be reproduced.

Figure 7:
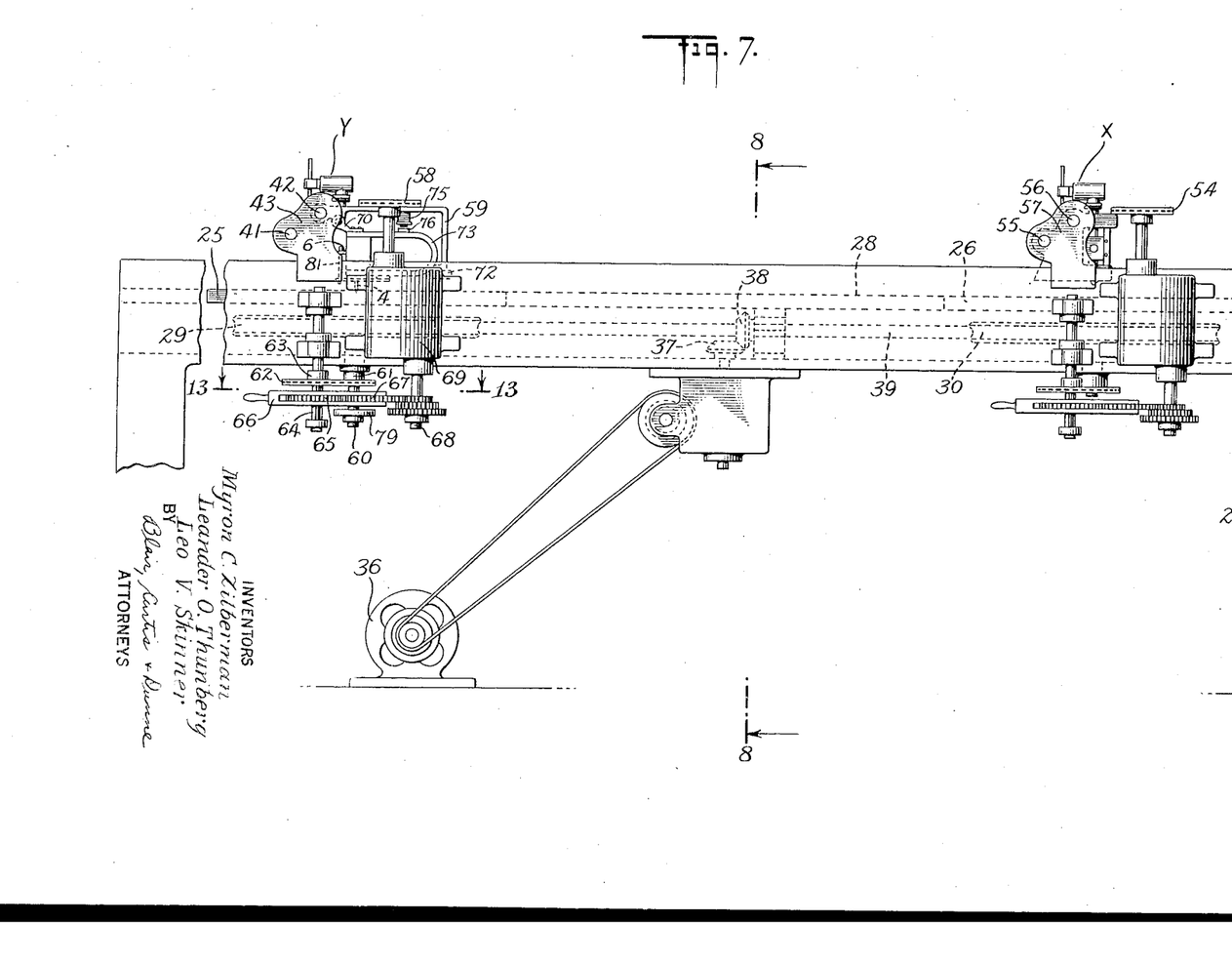
Figure 7, a front elevation of the machine illustrated in Figure 6.
Figure 8:
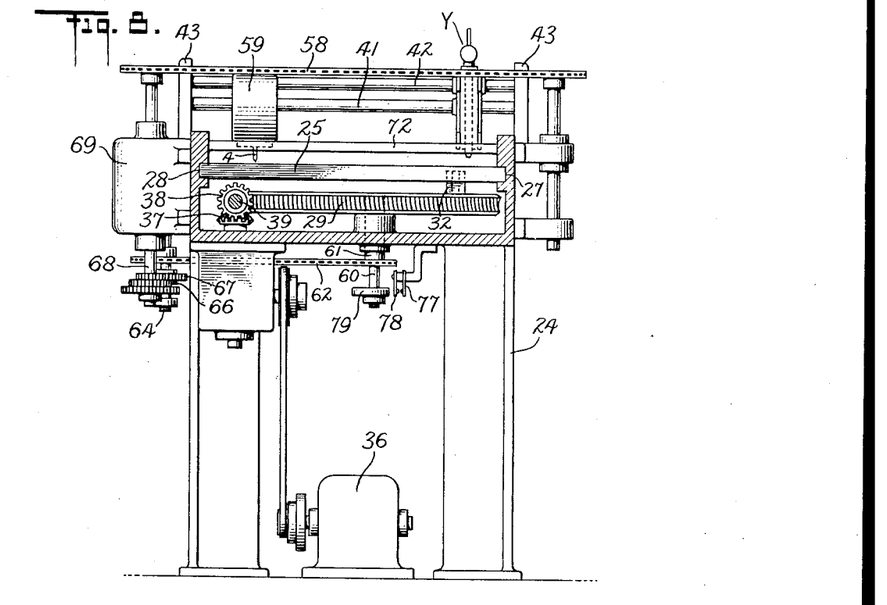
Figure 8, a transverse vertical section on the line 8—8 of Figure 7.
Figure 14:
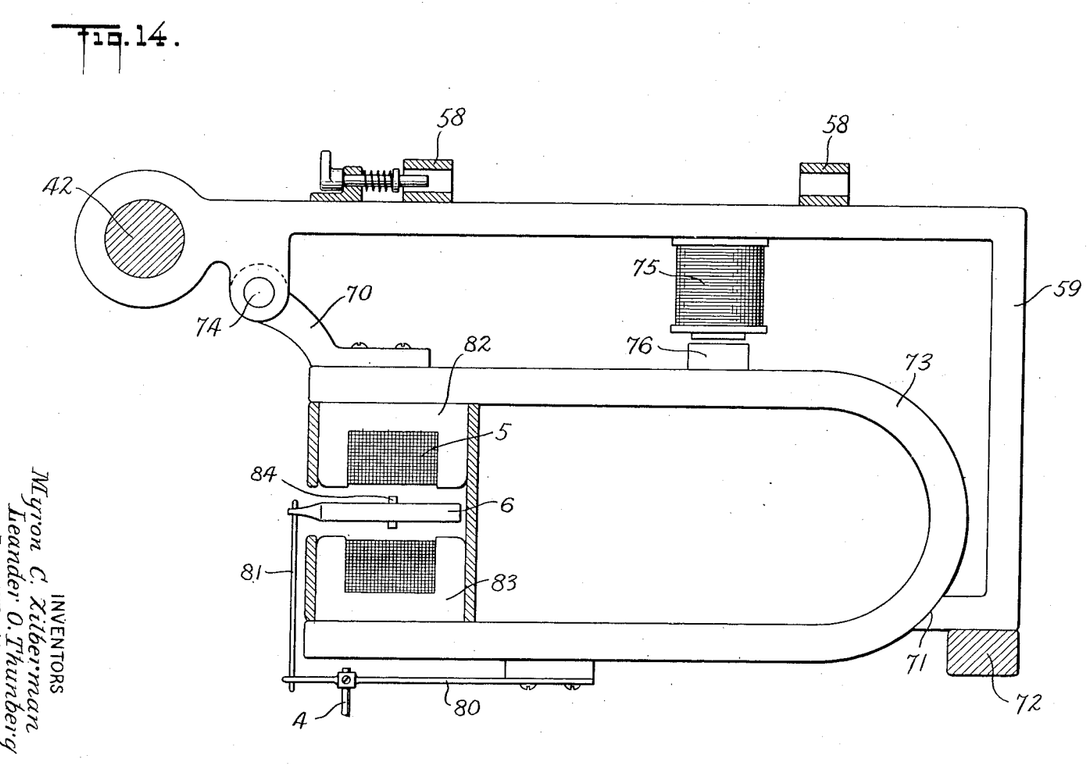
Figure 14, an enlarged detail view in elevation of a cutting head assembly including a stylus or cutting tool and instrumentalities for actuating the same.

The cutting head construction is illustrated more clearly in Figures 7 and 14 and comprises the L shaped bracket 59 having one end slidably engaging the transverse rod 42. Its other end is bent inwardly to form a magnet supporting shoulder 71 and rests upon and in sliding engagement with a transverse bar 72. One end of a U shaped permanent magnet 73 is pivotally secured to the bracket 59 at 74 by means of a strap 70. The opposite or curved end of said magnet normally rests upon the shoulder 71 or bracket 59 during cutting or advancing movement of the reciprocating table 25. During the return movement of said table, or when the engraving or cutting tool is not intended to effect cutting engagement with the plate 10, magnet 73 is raised and held out of operative cutting position until released. This is accomplished by an electromagnet 75 mounted on bracket 59 and having an armature 76 secured to the upper portion of permanent magnet 73. The coil of magnet 75 is in a circuit having the terminals 77 and 78, Figure 8, the latter being arranged in the path of travel of the edge of an eccentric cam 79 mounted on shaft 60, whereby said terminal 78 is engaged by said cam 79 and moved into and held in contact with terminal 77 during the return movement of table 25 from its advanced position to its retracted position. During advancing movement of said table, terminal 78 remains out of engagement with the terminal 77, and the circuit which includes the winding of magnet 75 is open, thus deenergizing the core of said magnet and permitting the permanent magnet 73 to occupy the down position resting against shoulder 71, as previously described.

As shown in Figure 14, the stylus or cutting tool 4 is supported above table 25 by a spring 80 secured to the under surface of magnet 73, the outer end of said spring 80 being connected to the outer end of armature 6 by a connecting rod 81. Pole pieces 82 and 83 are arranged between the spaced ends of permanent magnet 73 and cooperate with energizing coil 5 which is connected in circuit with amplifier 23 in the manner shown in Figure 5 and as previously described. The armature 6 is suspended in the field of coil 5 by means of a flexible strip 84 of brass, or the like, so that controlled rocking movement may be imparted to said armature in response to magnetic flux reversals occurring in the field of coil 5 and impulses of varying duration produced by operation of the scanning devices heretofore described.

In operation, a photograph, picture, or other representation to be reproduced, is placed in position on the table 26 and the plate or blank upon which the engraving is to be cut is placed on table 25. If the operator desires the lines or rows of cuts to extend across the plate at an angle to the longitudinal axis thereof, the plate will preferably be positioned on table 25 with its longitudinal axis at an angle to the longitudinal axis or direction of movement of the table 25. The longitudinal axis of the picture will occupy a similar relation to the longitudinal axis of table 26. It will be understood that the lines or rows of cuts may be made parallel with or at any desired angle to the longitudinal axis of the plate and that the picture will be arranged on table 26 to correspond thereto.

If the engraving to be made is the same size as the picture, the pins 31 will be positioned at the same distance from the centers of the gears 29 and 30, respectively. This equalizes the extent of movements of tables 25 and 26. If, however, the plate is to be smaller than the picture, pin 31 associated with gear 29 will be closer to the center thereof, whereby the extent of movement of table 25 will be shorter than the extent of movement of table 26. Obviously, whatever the adjustment in this respect, the cycle including the advance and return movements of both tables will occupy the same time.

During the to and fro movement of tables 25 and 26, the photoelectric cell 9 of scanning device Y is periodically energized and deenergized by light reflected from the alternately occurring white areas A and black areas B on strip 12; but on the return stroke, permanent magnet 73 is raised out of operating position so that, regardless of the impulses occurring during that period in the photoelectric cell 9 and transmitted through the instrumentalities previously described to the coil 5, no cutting of the plate occurs. To obtain the desired square shaped dots on the plate, the light areas A, or those which control the cutting time of the tool 4, are of greater extent than the dark areas B to compensate for a lag in the advance of the tool during cutting. In other words, in each tool cycle, the cutting time is longer than the noncutting time, but the distances between centers of cut portions are the same as the distances between centers of uncut portions of the plate. The strip 12 may be replaced by another like strip presenting markings to produce any other or different desired or necessary length or time relation between the up position and the down or cutting position of the tool in each complete cycle of periodic movement thereof.

During such to and fro movement of the tables 25 and 26, the photoelectric cell 8 of scanning device X is also energized substantially directly in proportion to the amount of light reflected from successively presented portions of the picture 10 to cell 8, as the picture moves beneath the open end of said scanning device. The variations in current produced by this scanning operation, after amplification as previously described, effect corresponding and proportionate changes in the direction of the cathode ray and consequently in the energizing of coil 5. Thus, during forward movement of the tables 25 and 26, the stylus 4 is periodically moved toward and away from cutting engagement with the plate 10 and at the same time, the extent of its movement toward said plate is controlled by operation of scanning device X, thereby controlling the depth of each cut and therefore the area of each increment of nonprinting surface.

At the end of each advancing movement of the tables 25 and 26, the cam 79 presses the terminal 78 into circuit closing contact with terminal 77 where it remains until the return movement of the tables has been completed, whereupon contact is again broken. While the circuit is closed, during said return movement of the tables, the permanent magnet 73 and stylus 4 are held in up position as previously described.

Among various important advantages residing in our improved method and apparatus, are the speed and economy with which a half-tone reproduction may be made in a single mechanical operation, as compared to the multiplicity of operations required for making a half-tone reproduction by known etching processes. In view of the contemplated rapidity of the cutting movement of the stylus, we also obtain new and valuable accuracy and certainty of operation and control, due in part to the inertialess character of the devices through which the effects of the controlling impulses are carried from the photoelectric cells 8 and 9 respectively to the coil 5 of the cutting head magnet. Furthermore, by synchronizing the effect of the scanning system Y with the reciprocating motion of table 25, the desired alignment characteristic of the typical half-tone dot effect on the plate is produced with complete accuracy, as compared with processes in which, for example, the cutting movement of the stylus is periodically interrupted independently of the to and fro movement of the plate. By concentrating control of the stylus cutting movement in the cathode ray and changing the path of said ray in relation to a suitable energy source, we are able to obtain speed and precision of operation which are difficult if not impossible to achieve by means of shutters or other devices wherein substantial masses of material are necessarily employed. Our apparatus also presents advantageous features due to the sensitivity and the rapid and powerful amplifying characteristics of the Thyratron tubes in the circuits associated therewith.

We claim—

1. Apparatus for photoelectric engraving comprising a picture scanning device, a support for a picture or pattern to be reproduced on a plate, a tool carrier, a plate cutting tool mounted thereon, a support for a plate, means for effecting relative reciprocative movement between said scanning device and the picture support, means for effecting relative reciprocative movement between said cutting tool carrier and said plate support, means for moving the tool carrier into plate cutting position prior to each relative movement between the plate and said tool in one direction and means for moving the tool carrier out of plate cutting position prior to each relative movement between the plate and said tool in the opposite direction, means operatively connected to said scanning device for actuating said cutting tool in accordance with the occurrence of light and wark portions respectively on said picture or pattern carried by said picture support, including an electro-magnet mounted on said carrier and having an armature operatively related to said tool in a manner to effect alternate movement of said tool into and out of cutting engagement with said plate, wherein the means for varying the duration of impulses in the magnet coil circuit include a ray sensitive screen for producing a light spot as the result of ray impact thereon, and means for bending said ray to vary the position of said light spot on said screen, said ray bending means including separate circuits having portions respectively arranged and adapted to produce ray deflecting forces operative in directions at 90 degrees to each other, one of said circuits having controlling devices to produce an E. M. F. of varying value and the other of said circuits having controlling devices to produce impulses of predetermined frequency and duration.

2. Apparatus for photoelectric engraving comprising a scanning device, means projecting a cathode ray along an approximate predetermined path, means periodically deflecting said ray from said approximate predetermined path through a given angle, means responsive to the effect produced by the object being scanned upon said scanning means for controlling the path of said cathode ray so as to position definitely said approximate predetermined path, means responsive to said cathode ray and adapted to initiate an electrical signal of constant intensity during each period produced by said periodic deflection of said ray, the length of each of said signals depending upon the position of said approximate predetermined path, a cutting tool and means projecting said cutting tool into cutting engagement for periods depending upon the length of each of said signals.

3. Circuit control apparatus for photoelectric engraving machines, comprising a photoelectric cell in a circuit to be controlled, a cathode ray tube, a ray sensitive screen positioned to present a ray produced light spot between the source of said ray and said photoelectric cell, a first controlling circuit having means therein to deflect said cathode ray to move said light spot on said screen in a path along one axis thereof over distances varying in proportion to varying current values in said circuit, another controlling circuit having means therein to deflect said cathode ray to periodically move said light spot across said screen at a predetermined rate of speed and in a direction 90 degrees from said first mentioned axis, and a light stop arranged between the screen and said photoelectric cell and having a triangular light beam passing aperture presenting a diagonally disposed edge at 45 degrees to said axes.

4. Circuit control apparatus for photoelectric engraving machines, comprising a photoelectric cell in a circuit to be controlled, a cathode ray tube, a ray sensitive screen positioned to present a ray produced light spot between the source of said ray and said photoelectric cell, a first controlling circuit having means therein to deflect said cathode ray to move said light spot on said screen in a path along one axis thereof over distances varying in proportion to varying current values in said circuit, another controlling circuit having means therein to deflect said cathode ray to periodically move said light spot across said screen at a predetermined rate of speed and in a direction 90 degrees from said first mentioned axis, and means for limiting the effective field for transmitting light rays to said photoelectric cell to a triangularly shaped area having one edge disposed diagonally in relation to said axes.

5. In apparatus for photoelectric engraving, the combination of a plate cutting tool, an electro-magnet for moving said tool into and out of cutting engagement with a plate to be engraved and for holding said tool in said cutting and non-cutting positions respectively, a photoelectric cell in operative relation to the circuit of the coil of said electro-magnet, and means for energizing said photoelectric cell to produce in said coil circuit periodic impulses of varying duration including means for producing a field of variable potential, a source of light operatively related to said photoelectric cell and to said field producing means, and means for periodically varying the potential of said field to interrupt the cell energizing effect of light from said source and for varying the duration of successive occurrences of said periodic interruptions of said energizing effect.

6. In apparatus for photoelectric engraving, the combination of a plate cutting tool, an electro-magnet for moving said tool into and out of cutting engagement with a plate to be engraved and for holding said tool in said cutting and non-cutting positions respectively, a photoelectric cell in operative relation to the circuit of the coil of said electro-magnet, means for energizing said photoelectric cell to produce in said coil circuit periodic impulses of varying duration including means for producing a field of variable potential, a cathode ray tube and a ray sensitive screen positioned to intercept cathode rays generated in said tube to produce a source of light in the form of a light spot on said screen in operative relation to said photoelectric cell, said field producing means including controllably energized circuits, means in one of said circuits for causing periodic deflection of the cathode ray and corresponding movement of said light spot in one direction on said screen, means in another of said circuits for causing varying deflection of said ray and corresponding movement on the screen of said light spot in a direction normal to that of said periodic deflection and simultaneously therewith, whereby the path of movement of said light spot on the screen is determined by the composite effect of said deflections of the cathode ray, and means for limiting the operative cell energizing effect of movement of the light spot to a triangular field at one side of the diagonal in a barrier extending transversely across the path of said cathode ray.

MYRON C. ZILBERMAN.
LEANDER O. THUNBERG.
LEO V. SKINNER.